United States Patent [19]

Osawa

[11] Patent Number: 5,308,166
[45] Date of Patent: May 3, 1994

[54] LINEAR GUIDE APPARATUS

[75] Inventor: Nobuyuki Osawa, Gunma, Japan

[73] Assignee: NSK Ltd., Tokyo, Japan

[21] Appl. No.: 990,986

[22] Filed: Dec. 16, 1992

[30] Foreign Application Priority Data

Dec. 17, 1991 [JP] Japan ............................ 3-110391[U]

[51] Int. Cl.$^5$ ............................................. F16C 29/06
[52] U.S. Cl. ......................................................... 384/45
[58] Field of Search ................................. 384/43–45

[56] References Cited

U.S. PATENT DOCUMENTS

| | | | |
|---|---|---|---|
| 4,582,369 | 4/1986 | Itoh | 384/45 X |
| 4,902,143 | 2/1990 | Morita | 384/45 X |
| 4,929,095 | 5/1990 | Osawa | 384/45 |
| 4,929,096 | 5/1990 | Osawa | 384/45 |
| 5,044,779 | 9/1991 | Albert et al. | 384/45 X |
| 5,123,754 | 6/1992 | Tanaka | 384/45 |

*Primary Examiner*—Thomas R. Hannon
*Attorney, Agent, or Firm*—Sughrue, Mion, Zinn, Macpeak & Seas

[57] ABSTRACT

A linear guide apparatus comprises: a slider body having ball rolling grooves opposed to ball rolling grooves of a guide rail which are extended axially in parallel to each other; end caps secured respectively to both ends of the slider body, each end cap having a ball retainer locking portion in a joining surface which is in contact with the slider body; and a ball retainer having engaging portions which are engaged with the ball retainer locking portion of the end caps, and both side walls each of which defines with an edge of one of the ball rolling grooves of the slider body an opening which is slightly smaller than a diameter of rolling balls. The engaging portions are movably engaged with the ball retainer engaging portions of the end caps so that the ball retainer is movably held on the slider body. Thus, the apparatus is excellent in operability in which the balls are not excessively pushed by the ball retainer.

4 Claims, 3 Drawing Sheets

LINEAR GUIDE APPARATUS

BACKGROUND OF THE INVENTION

1. Field of the Invention

This invention relates to an improvement of a linear guide apparatus comprising a guide rail and a slider movable on it through rolling of balls interposed therebetween.

2. Description of the Prior Art

A linear guide apparatus has been disclosed, for instance, by instance U.S. Pat. No. 4,929,095 which comprises: an axially extending guide rail with ball rolling grooves formed in both corner edges between an upper surface and both side surfaces; a slider mounted on the guide rail and movable in an axial direction and having ball rolling grooves formed in an inner surface at positions respectively opposing the ball rolling groves of the guide rail, and a plurality of balls mounted in the mutually opposing ball rolling grooves of the guide rail and the slider, and the slider including a slider body, end caps secured to both ends of the slider body, and a ball retainer held by the end caps which is made up of a rectangular frame-shaped main portion, and engaging portions protruded axially from opposite ends of the main portion, the engaging portions being engaged with ball retainer locking portions formed in the end caps to secure the ball retainer to the slider body.

In the conventional linear guide apparatus, the ball retainer is positively fixed by engaging the ball retainer locking portions of the end caps with the engaging portions of the ball holder as was described above. Hence, the apparatus suffers from the following problems: Components forming the apparatus are unavoidably fluctuated in dimension when manufactured; therefore, it is unavoidable that the end caps are shifted in position when connected to the slider body, the ball retainer is shifted in position when coupled to the end caps, or the engaging portions of the ball retainer is shifted. Hence, frequently the ball retainer secured to the slider is greatly shifted towards the train of balls rolling in the ball rolling grooves of the slider. If the ball retainer is shifted in this manner, it applies a great pressure to the balls, as a result of which the balls are not smoothly circulated, thus adversely affecting the operation of the apparatus. The end caps and the ball retainer are injection-molded products of synthetic resin. Hence, even if the molds thereof are satisfactory, the resultant product is often unsatisfactory; that is, the ball retainer mounted is shifted in position depending on delicate differences of molding conditions. In this case, such unacceptable products will be formed in great quantities, and it will take a great deal of labor and time to fix them. However, it is not desirable to increase the manufacturing accuracy of the components of the linear guide apparatus, because it will increase the manufacturing cost of the latter.

SUMMARY OF THE INVENTION

In view of the foregoing, an object of this invention is to provide a linear guide apparatus excellent in operability in which the balls are not excessively pushed by the ball holder.

The foregoing object and other objects of the invention have been achieved by the provision of a linear guide apparatus which, according to the invention, comprises: a slider body having ball rolling grooves opposed to ball rolling grooves of a guide rail which are extended axially in parallel to each other; end caps secured respectively to both ends of the slider body, each end cap having a ball retainer locking portion in a joining surface which is in contact with the slider body; and a ball retainer having engaging portions which are engaged with the ball retainer locking portion of the end caps, and both side walls each of which defines with an edge of one of the ball rolling grooves of the slider body an opening which is slightly smaller than a diameter of rolling balls, the ball retainer being movably held on the slider body with the engaging portions being movably engaged with the ball retainer engaging portions of the end caps.

In the linear guide apparatus, as was described above, the ball retainer has the engaging portions which are engaged with the ball retainer locking portions of the end caps, and both side walls each of which defines with the edge of one of the ball rolling grooves of the slider body the opening which is slightly smaller than the diameter of the rolling balls, and the engaging portions of the ball retainer are movably engaged with the ball retainer locking portions of the end caps. Hence, even when the ball retainer is shifted towards one side of the train of balls, thus pushing the balls therein, there is maintained a small gap between the ball retainer locking portion of the end cap and the engaging portion of the ball retainer; that is, the balls will never be greatly pushed by the ball retainer when mounted. Furthermore, when the ball retainer is shifted towards the train of balls, it is substantially in parallel with the upper ball rolling grooves of the slider body being in alignment with the train of balls; that is, it will not obstruct the movement of the ball, protruding into the path of the balls.

The nature, principle, and utility of the invention will be more clearly understood from the following detailed description of the invention when read in conjunction with the accompanying drawings.

DESCRIPTION OF THE PREFERRED EMBODIMENTS

A linear guide assembly, one embodiment of this invention, will be described with reference to the accompanying drawings.

Figure 4:
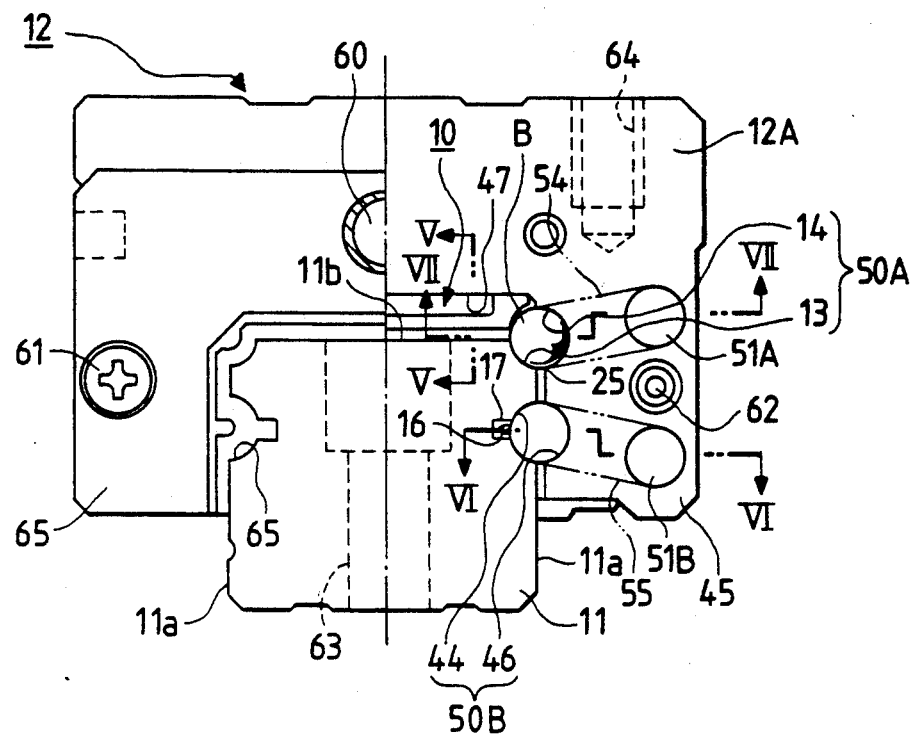
FIG. 4 is a front view of a linear guide apparatus with a right half part cut away.
Figure 5:
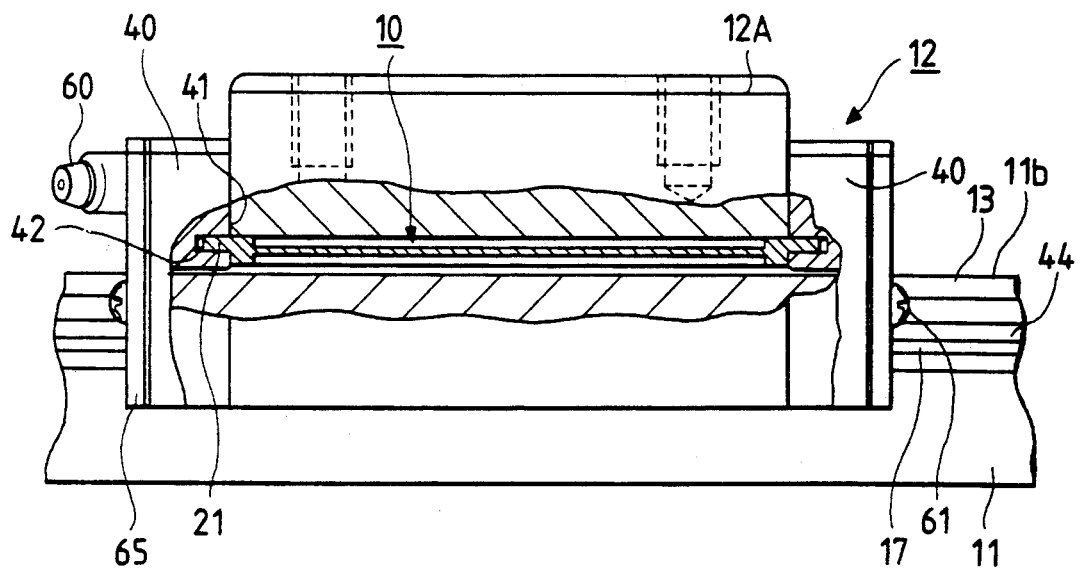
FIG. 5 is a side view with a part of FIG. 4 in cross section taken along line V—V in FIG. 4.

The linear guide assembly of the invention, as shown in FIGS. 4 and 5, comprises guide rail 11, and a slider 12.

The guide rail 11 is an elongated member having a rectangular cross section. In the guide rail 11, an upper ball rolling groove 13 having a substantially quarter circular cross section and extending axially is formed in each of the edges between an upper surface 11b and side surfaces 11a and 11a, and a lower ball rolling groove 44 having a substantially half-circular cross section is formed in each of the side surfaces 11a in such a manner that the groove 44 is located below the groove 13. The upper ball rolling grooves 13 and the lower ball rolling grooves 44 are in parallel with one another. An escape channel 17 is formed along the axial direction in the bottom of each of the lower ball rolling grooves 44 so that a wire-shaped ball retainer 16 (FIG. 6) is loosely fitted in it.

The slider 12 has a slider body 12A which is an inverted U-shaped member which is obtained by forming a recess having a rectangular cross section in the lower surface of a block having a rectangular cross section. The slider body 12A is engaged through the recess with the upper portion of the guide rail 11, and has upper ball rolling grooves 14 which are respectively opposed to the upper ball rolling grooves 13 of the guide rail 11, and lower ball rolling grooves 46 respectively opposed to the lower ball rolling grooves 44. In a thick wall portion of a side wall 45 of the slider body 12A, there are formed an upper ball returning path 51A and a lower ball returning path 51B which are in parallel with the upper and lower ball rolling grooves 14 and 46.

End caps 40 are attached respectively to opposite ends of the slide body 12A. The end caps 40 are injection-molded products of a synthetic resin material, and have an inverted U-shape similar to the slide body 12A. Each of the end caps 40 is formed with upper and lower curved paths 54 and 55 of a half doughnut shape in a joining end surface 41 of each side wall. The upper curved paths 54 are communicated with an upper ball rolling path 50A (described later) and the upper ball returning path 51A, and the lower curved paths 55 are communicated with a lower ball rolling path 50B (described later) and the lower ball returning path 51B.

The upper ball rolling path 50A is formed by the upper ball rolling groove 13 of the guide rail 11 and the upper ball rolling groove 14 of the slider 12. The lower ball rolling path 50B is formed by the lower ball rolling groove 44 of the guide rail and the lower ball rolling groove 46 of the slider.

A ball infinitely circulating route constituted by the upper ball rolling path 50A, the upper ball returning path 51A, and the upper curved paths 54, and a ball infinitely circulating route constituted by the lower ball rolling path 50B, the lower ball returning path 51B, and the lower curved paths 55 are formed in each lateral side of the guide rail 11 so that a plurality of balls B roll in each ball infinitely circulating route with the movement of the slider 12.

In each of the curved paths 54 and 55 of the end caps 40, there is formed a ball scooping projection 57 protruding in a half circular shape at an inner end of a guide surface adapted to guide the balls B outwardly. The ball scooping projection 57 has a tip having an acute angle in such a manner that it is positioned closed to the ball rolling groove 13 or 44.

Figure 1:
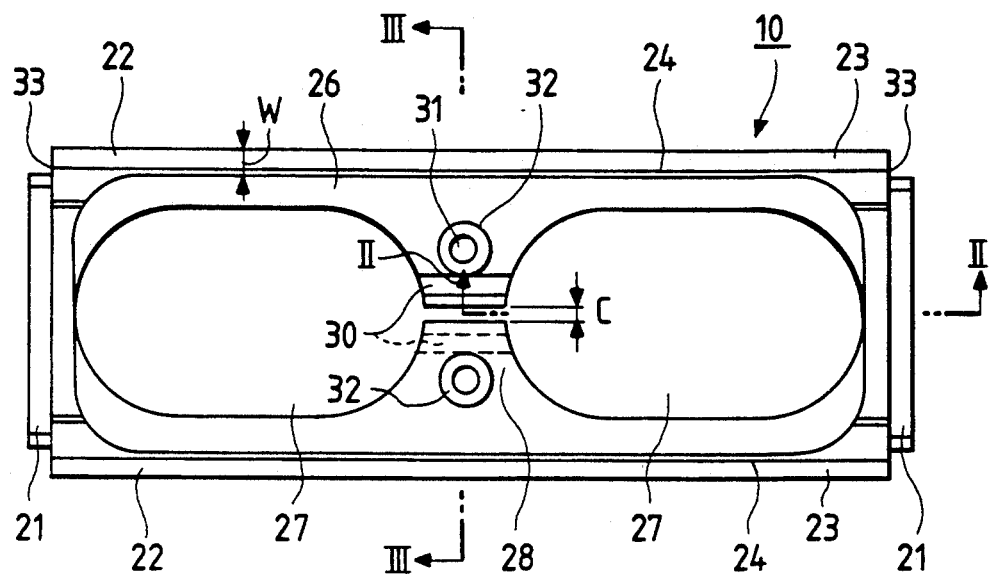
FIG. 1 is a bottom view of a ball retainer.
Figure 2:
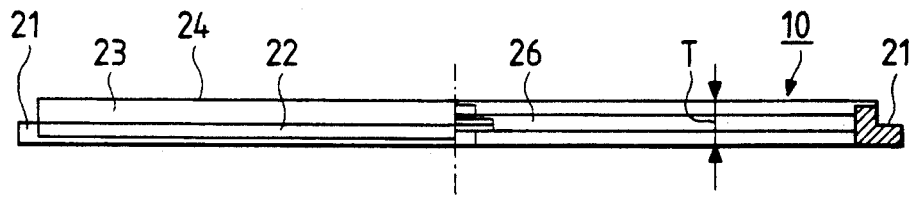
FIG. 2 is a side view of the ball retainer with a right half section taken along line II—II in FIG. 1.
Figure 3:
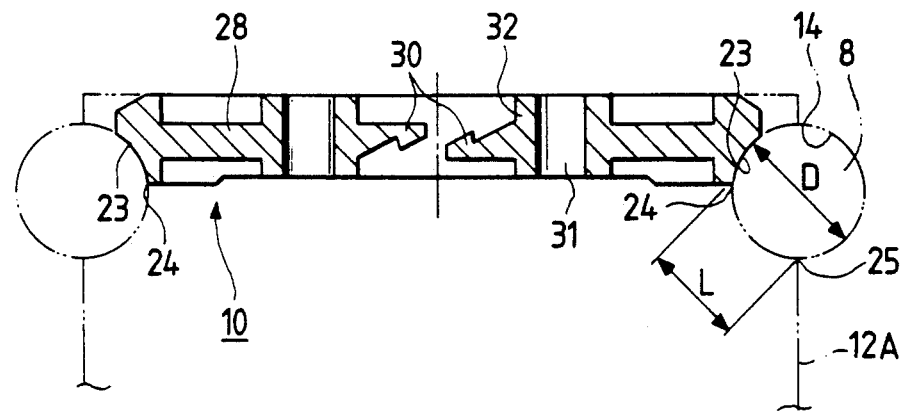
FIG. 3 is a sectional view taken along line III—III in FIG. 1.

A ball retainer 10 is attached to the recess of the slider 12 which is substantially U-shaped in section and is mounted on the guide rail 11 in such a manner that it is axially movable relative to the latter 11. The ball retainer 10 is accommodated in a space between the upper surface 11b of the guide rail and the bottom 47 of the recess of the slider body 12. The ball retainer 10 has engaging portions 21 at both ends, which are loosely fitted, with a gap e, in ball retainer locking portions 42 which are recesses formed in the end caps. The ball retainer locking portions 42 are provided at the surfaces 41 of the end caps 40 which are brought in contact with the slider body 12A. Hence, even when the ball retainer 10 is shifted, thus contacting one side of the train of balls, a gap is maintained between the ball retainer locking portion 42 and the engaging portion 21 of the ball retainer. And, as shown in FIG. 3, an opening having a width L slightly smaller than the diameter D of the balls B is normally formed between the lower end edge 24 of each of the ball holding grooves 23 of the ball retainer 10 and the lower edge 25 (chain line) of the upper ball rolling groove 14 of the slider 12.

The ball retainer 10 is a substantially rectangular shaped frame, which is an injection-molded product of a synthetic resin material. The engaging portions 21 are protruded from opposite end faces 33 and 33, in a longitudinal direction, of the frame, and the distance between the end faces 33 and 33 is slightly shorter than the length of the slider body 12A, thus providing a slight gap f. The ball retainer 10 has both (right and left) side frames 22 having a thick wall extending linearly along the upper ball rolling grooves 14 of the slider 12. The wall thickness T and the width W of each side frame 22 are set to the extent that the side frame 22 can be deflected inwardly in a curved shape being elastically deformed when an external force is applied inwardly to the side frame 22 during assembling. Each of the side frames 22 has the aforementioned ball holding groove 23. More specifically, the groove 23 is formed in the outer side surface of each of the side frames 22, and it is of a substantially quarter circular cross section and extends over the overall length thereof. The ball holding grooves 23 hold the balls B of the pair of right and left upper ball rolling grooves 14 of the slider 12.

The ball retainer 10 has thin planar portion 26 between the side frames 22 and 22 which includes two elliptic holes 27. That is, the two holes 27 are formed by cutting out a major part of the planar portion of the ball retainer 10 in such a manner that the two holes 27 are arranged in the longitudinal direction. Portions of the planar portion 26 sandwiched by the two holes 27, which are at the middle of the overall length of the side frames 22, protrude inwardly to oppose each other from the side frames 22 and 22 and form inwardly extending portions 28. Those inwardly extending portions 28 are spaced from each other with an interval C located near the center line of the ball retainer 10.

Engaging hook portions 30 having a hook shape are provided at opposing ends of the inwardly extending portions 28. The hook portions 30 are spaced normally facing each other with the interval, and they are engaged with each other when the side frames 22 and 22 are deflected inwardly in a curved shape. A pair of bosses 32 having work holes 31 are formed at the base portions of the hook portions 30, respectively. A tool, such as a snap ring for a hole, can be applied to the work holes 31.

Figure 6:
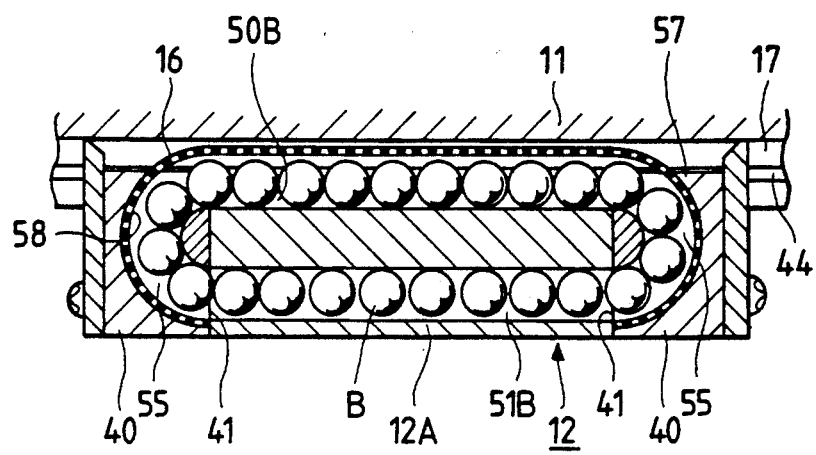
FIG. 6 is a sectional view taken along line VI—VI in FIG. 4.
Figure 7:
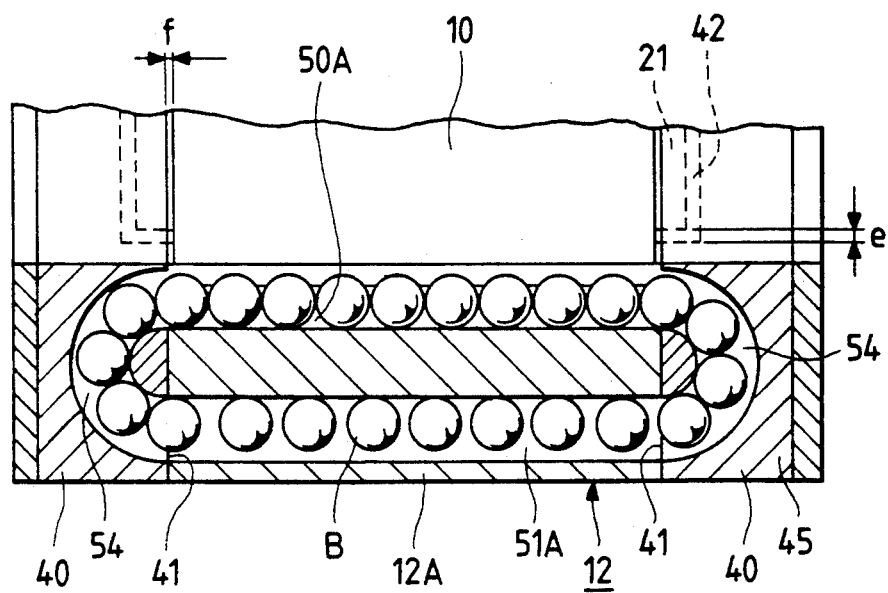
FIG. 7 is a sectional view taken along line VII—VII in FIG. 4.

As shown in FIG. 6, the wire-shaped ball retainer 16 holds the balls B in the lower ball rolling groove 46 to prevent the balls B from falling out thereof. The wire-shaped ball retainer 16 is mounted in a wire holding channel 58 formed in a bottom guide surface of the lower curved path 55 of the end cap 40. When the slider 12 is assembled to the guide rail, the wire-shaped ball retainer 16 is accommodated in the wire escape channel 17, which prevents interference with the guide rail 11.

In FIGS. 4 and 5, reference numeral 60 designates an oil feed nipple attached to the end cap 40. A lubricant injected to the nipple 60 is fed to the upper ball rolling path 50A and the lower ball rolling path 50B through an oil feeding groove (not shown) formed in the joining surface 41 of the end cap 40. Reference numeral 61 designates a fixing screw for attaching the end cap 40 to the slider body 12A, and reference numeral 62 designates a screw hole for the screw 61.

Further in FIGS. 4 and 5, reference numeral 63 designates a through-hole for a bolt to secure the guide rail 11 to a base or the like (not shown) when the linear guide apparatus is to be used, and reference numeral 64 designates a screw hole for a screw to fix a driven member, such as a table or the like, to the slider 12. Moreover, reference numeral 65 designates a wiper seal made of a synthetic resin material and attached to the end cap 40 for preventing the intrusion of foreign particles by wiping the ball rolling grooves 13 and 44 of the guide rail 11.

In attaching the end cap 40 to the slider body 12A for assembling of the linear guide apparatus, the engaging portion 21 of the ball retainer 10 is inserted into the ball retainer locking portion 42 formed in the joining end surface 41 of the end cap 40. Next, with the joining end surfaces 41 of the end caps 40 in contact with the joining end surfaces of the slider body 12, and with the wiper seals 65 on the outer end faces of the end caps 40, the latter 40 are fixedly secured to the slider body 12A by screwing the screws 61 into the screw holes 62. The procedure of mounting the balls B to the upper ball rolling groove 14 of the slider to which the ball retainer 10 has been assembled is as follows: With the hook portions 30 of the ball retainer 10 engaged with each other, the side frames 22 and 22 are deflected inwardly in a curved shape to increase the distance between the upper ball rolling groove 14 thereby to allow the mounting of the balls B.

In the case where the end caps 40 are shifted when coupled to the slider body 12, or in the case where the engaging portions 21 of the ball retainer or the ball retainer locking portions 42 of the end caps are shifted when positioned, the ball retainer 10 is shifted towards one side of the train of balls or it is set inclined. As a result, the ball retainer 10 comes in the path of the balls B, thus obstructing the rolling of the latter B. However, in the apparatus of the invention, even when the ball retainer 10 is in contact with the balls B, the gap e is maintained between the ball retainer locking portion 42 of the end cap 40 and the engaging portion 21 of the ball retainer 10; that is, the ball retainer 10 is movable, not pushing the balls B excessively. In other words, the ball retainer 10 is positioned by the balls B fitted in the upper ball rolling grooves 14 of the slider. Hence, the apparatus is free from the difficulty that the balls are not smoothly circulated being excessively obstructed or resisted by the ball retainer. That is, the linear guide apparatus is excellent in operability. Furthermore, the apparatus operates satisfactorily although its components are not so high in accuracy. That is, the apparatus of the invention, unlike the conventional one, is free from the difficulty that a great deal of time and labor is required for fixing the components. Thus, the manufacture of the apparatus shows a high yield. Furthermore, no adjustment is required in assembling the apparatus. More specifically, and therefore the apparatus can be assembled readily, and it is low in manufacturing cost.

In the linear guide apparatus of the invention, the ball retainer has both side walls each of which defines with the edge of each of the ball rolling grooves of the slider body the opening which is slightly smaller than the diameter of the rolling balls, and the engaging portions of the ball retainer are movably engaged with the ball retainer locking portions of the end caps. Hence, the apparatus is free from the difficulty that the balls are not smoothly circulated being excessively obstructed or resisted by the ball retainer. That is, the apparatus is excellent in operability. Furthermore, in the apparatus, the end caps and the ball retainer may be injection-molded products of ordinary accuracy; that is, the use of those components will never adversely affect the operation of the apparatus. Thus, the manufacture of the apparatus shows a high yield. More specifically, the apparatus Can be assembled readily, and it is low in manufacturing cost.

While there has been described in connection with the preferred embodiment of this invention, it will be obvious to those skilled in the art that various changes and modifications may be made therein without departing from the invention, and it is aimed, therefore, to cover in the appended claim all such changes and modifications as fall within the true spirit and scope of the invention.

What is claimed is:

1. A linear guide apparatus comprising:
   a guide rail having ball rolling grooves;
   a slider body having ball rolling grooves opposed to said ball rolling grooves of said guide rail which are extended axially in parallel to each other;
   end caps secured respectively to both ends of said slider body, each end cap having a ball retainer locking portion in a joining surface which is in contact with said slider body; and
   a plurality of balls inserted in the corresponding ball rolling grooves of said guide rail and said slider body;
   a ball retainer having engaging portions which are engaged with said ball retainer locking portion of said end caps, and both side walls each of which defines, with an edge of each of said ball rolling grooves of said slider body, an opening which is slightly smaller than a diameter of said balls; and
   means for preventing movement of the balls from being obstructed by said ball retainer, said preventing means being provided in such a manner that said ball retainer is movably mounted on said slider body with said engaging portions which is movably engaged with said ball retainer locking portions of said end caps.

2. A linear guide apparatus according to claim 1, in which said ball retainer is made of a synthetic resin material, and said engaging portions of said ball retainer are loosely fitted in said ball retainer locking portion with a predetermined gap.

3. A linear guide apparatus according to claim 1, in which said ball retainer comprises a substantially rectangular shaped frame of which said engaging portions are protruded from opposite end faces in a longitudinal direction, a distance between the end faces being slightly shorter than the length of said slider body so as to define a predetermined gap.

4. A linear guide apparatus according to claim 3, in which said frame is made of a synthetic resin material.

* * * * *